United States Patent
Zhang et al.

(10) Patent No.: US 10,924,758 B2
(45) Date of Patent: Feb. 16, 2021

(54) METHOD AND APPARATUS FOR DETERMINING A MOTION VECTOR

(71) Applicant: SAMSUNG ELECTRONICS CO., LTD., Suwon-si (KR)

(72) Inventors: Jun Zhang, Beijing (CN); Jie Chen, Beijing (CN); Yue Wu, Beijing (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/496,744

(22) PCT Filed: Apr. 30, 2018

(86) PCT No.: PCT/KR2018/004996
§ 371 (c)(1),
(2) Date: Sep. 23, 2019

(87) PCT Pub. No.: WO2018/225949
PCT Pub. Date: Dec. 13, 2018

(65) Prior Publication Data
US 2020/0036996 A1  Jan. 30, 2020

(30) Foreign Application Priority Data
Jun. 6, 2017  (CN) .......................... 201710416329.X

(51) Int. Cl.
*H04N 19/52* (2014.01)
*H04N 19/577* (2014.01)
(Continued)

(52) U.S. Cl.
CPC .......... *H04N 19/52* (2014.11); *H04N 19/521* (2014.11); *H04N 19/573* (2014.11); *H04N 19/577* (2014.11)

(58) Field of Classification Search
CPC ....... H04N 19/573; H04N 19/52; H04N 19/56
See application file for complete search history.

(56) References Cited

U.S. PATENT DOCUMENTS

2013/0287093 A1* 10/2013 Hannuksela ........... H04N 19/30
　　　　　　　　　　　　　　　　　　　　　　375/240.02
2014/0049605 A1*  2/2014 Chen ...................... H04N 19/52
　　　　　　　　　　　　　　　　　　　　　　348/43
(Continued)

FOREIGN PATENT DOCUMENTS

WO　　　2014028870 A1　　2/2014
WO　　WO-2018210315 A1 * 11/2018 ............. H04N 19/55

OTHER PUBLICATIONS

International Search Report (PCT/ISA/210), issued by International Searching Authority in corresponding International Application No. PCT/KR2018/004996, dated Sep. 11, 2018.
(Continued)

*Primary Examiner* — Mainul Hasan
(74) *Attorney, Agent, or Firm* — Sughrue Mion, PLLC

(57) ABSTRACT

A method for determining a motion vector includes: determining at least one inter-layer reference block by referring to an inter-layer corresponding block of a current processing block; determining the motion vector(s) of the current processing block according to the motion vector(s) of the determined at least one inter-layer reference block as well as the motion vectors of the other adjacent blocks of the current processing block.

7 Claims, 5 Drawing Sheets

At least one inter-layer reference block is determined by referring to an inter-layer corresponding block of a current processing block — 101

The motion vector(s) of the current processing block is determined according to the motion vector(s) of the determined at least one inter-layer reference block as well as the motion vectors of the other adjacent blocks of the current processing block — 102

(51) Int. Cl.
*H04N 19/573* (2014.01)
*H04N 19/513* (2014.01)

(56) References Cited

U.S. PATENT DOCUMENTS

| | | | | |
|---|---|---|---|---|
| 2014/0161186 A1* | 6/2014 | Zhang | ............... | H04N 19/52 |
| | | | | 375/240.16 |
| 2014/0198181 A1* | 7/2014 | Chen | ............... | H04N 19/597 |
| | | | | 348/43 |
| 2014/0294088 A1* | 10/2014 | Sung | ............... | H04N 19/96 |
| | | | | 375/240.16 |
| 2014/0301463 A1* | 10/2014 | Rusanovskyy | ........ | H04N 19/39 |
| | | | | 375/240.14 |
| 2015/0085935 A1* | 3/2015 | Chen | ............... | H04N 19/597 |
| | | | | 375/240.16 |
| 2015/0271524 A1* | 9/2015 | Zhang | ............... | H04N 19/30 |
| | | | | 375/240.16 |
| 2015/0296222 A1* | 10/2015 | Llin | ............... | H04N 19/52 |
| | | | | 375/240.16 |
| 2015/0341664 A1* | 11/2015 | Zhang | ............... | H04N 19/597 |
| | | | | 375/240.12 |
| 2016/0073115 A1* | 3/2016 | Yoon | ............... | H04N 19/52 |
| | | | | 375/240.12 |

OTHER PUBLICATIONS

Written Opinion (PCT/ISA/237) issued by the International Searching Authority in corresponding International Application No. PCT/KR2018/004996, dated Sep. 11, 2018.

Min Woo Park et al. "Overview of Inter-Component Coding in 3D-HEVC" Journal of Broadcast Engineering, vol. 20, No. 4, Jul. 31, 2015, (pp. 545-556).

Ying Chen et al. "Test Model 8 of 3D-HEVC and MV-HEVC", Joint Collaborative Team on 3D Video Coding Extension Development of ITU-T SG 16 WP 3 and ISO/IEC JTC 1/SC 29/WG 11, JCT3V-H1003, 8th Meeting, Valencia, ES, Mar. 4, 2014, (pp. 1-54).

Jun Zhang et al. "Depth based two-step disparity vector derivation for AVS2-3D", 2016 Visual Communications and Image Processing (VCIP), Nov. 30, 2016, (pp. 1-4).

Wenyi Su et al. "Depth-Based Motion Vector Prediction in 3D Video Coding" 2012 Picture Coding Symposium (PCS), May 9, 2012, (pp. 37-40).

* cited by examiner

[Fig. 1]
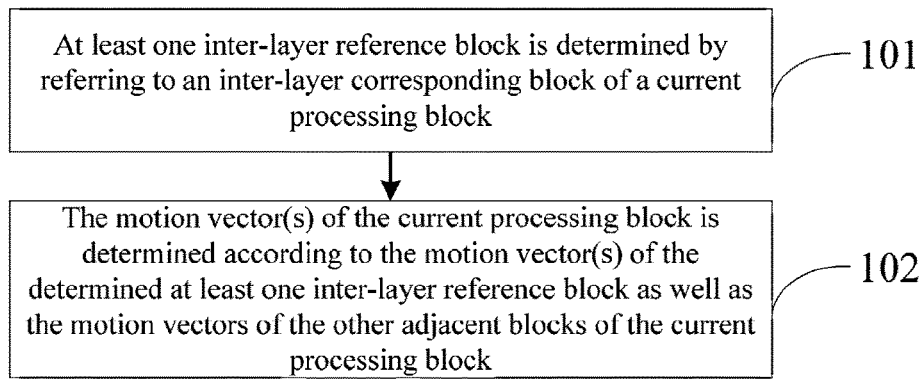
[Fig. 2]
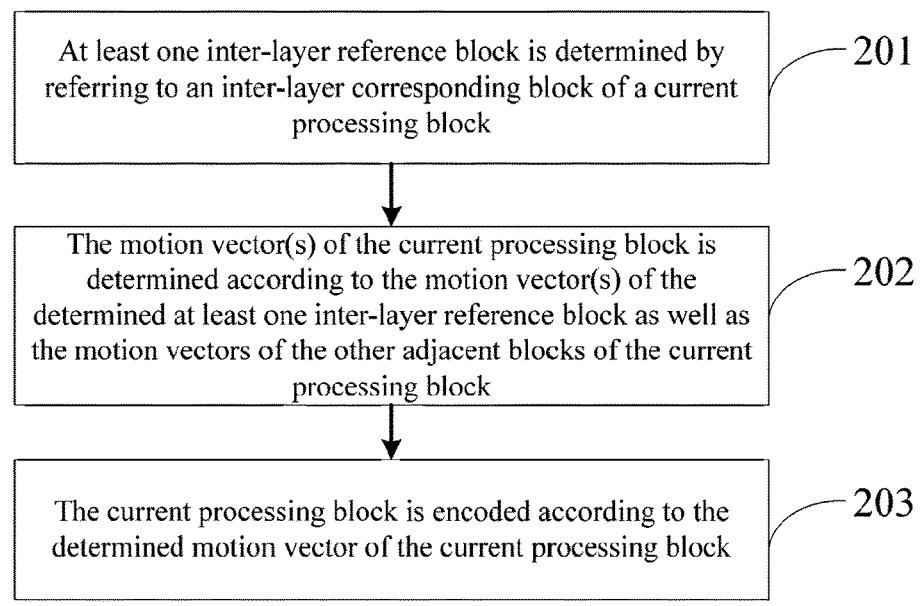
[Fig. 3]
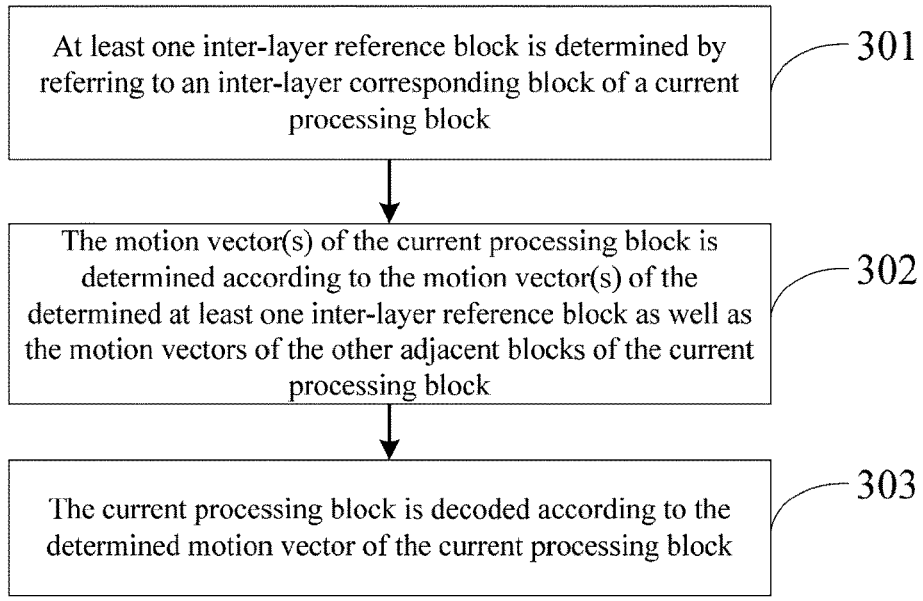

[Fig. 4]
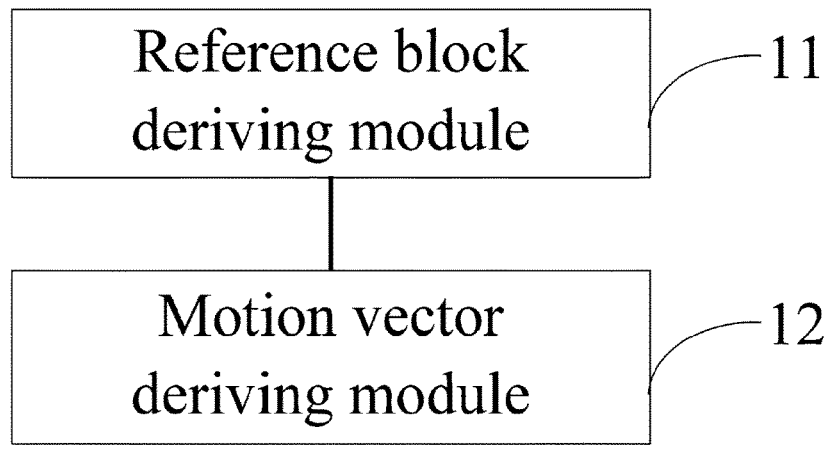
[Fig. 5]
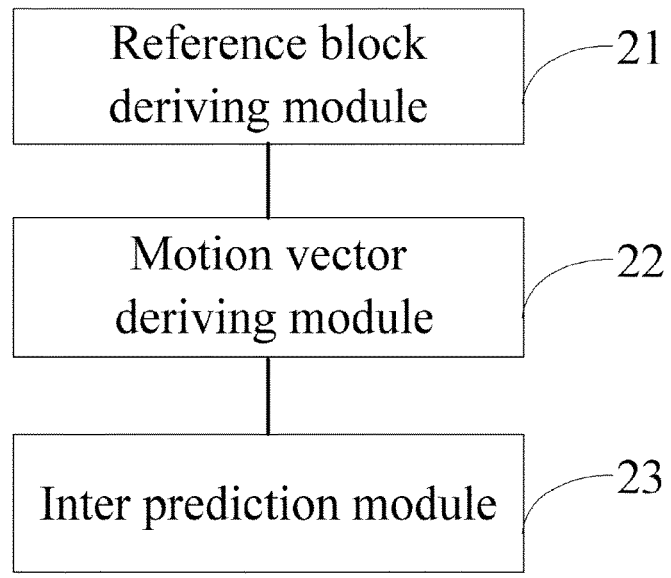
[Fig. 6]
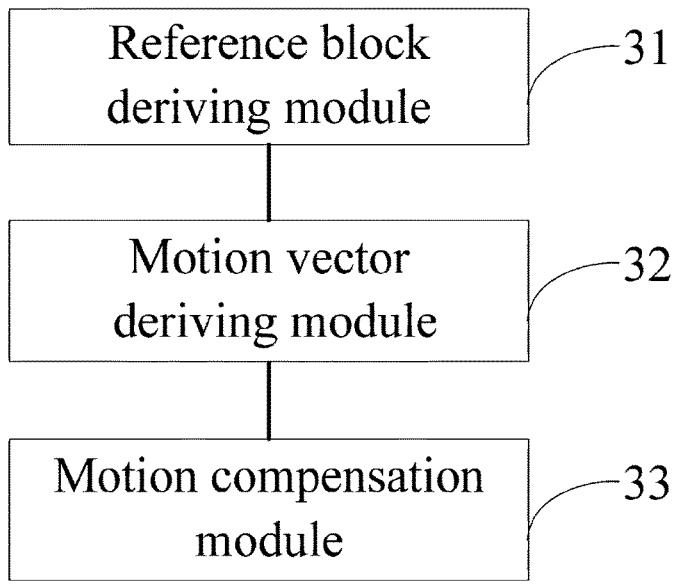

[Figure 7]
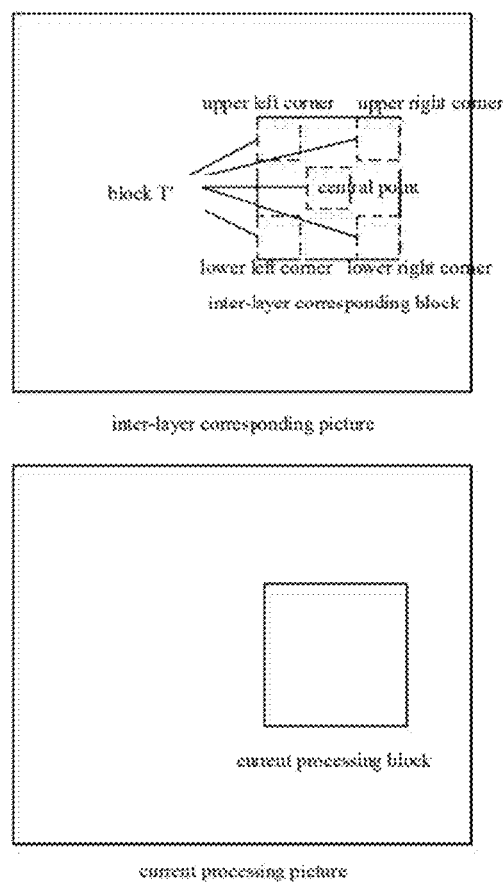

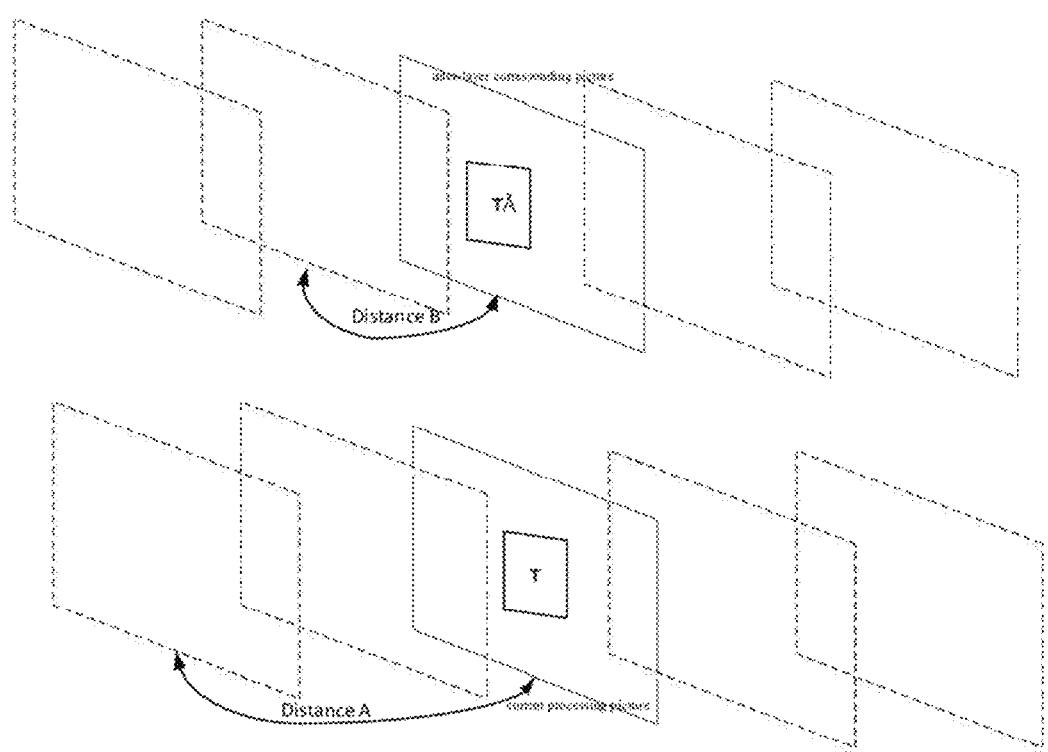
[Figure 8]

[Figure 9]
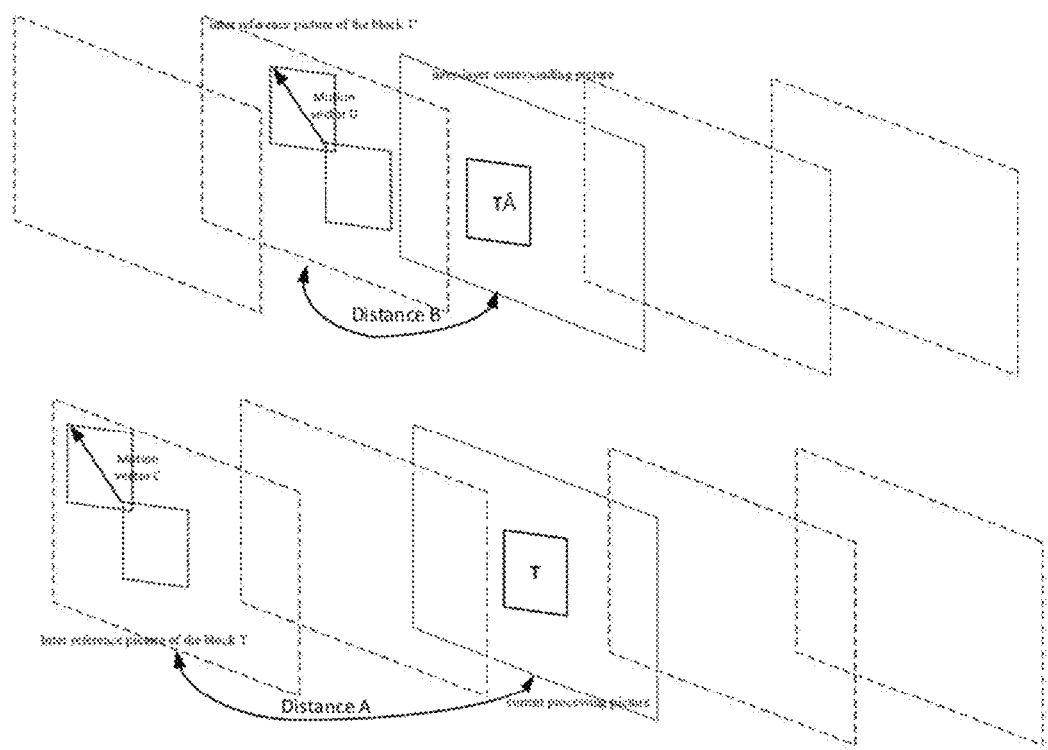

METHOD AND APPARATUS FOR DETERMINING A MOTION VECTOR

TECHNICAL FIELD

The present disclosure relates to the technical field of information processing, and in particular to a method and apparatus for determining a motion vector.

BACKGROUND ART

In a video, both of temporally adjacent blocks and spatially adjacent blocks are highly correlated with a current encoding block in terms of content, thus the motion vectors thereof are highly correlated as well. Therefore, the motion vector(s) of the current block may be derived by referring to the motion vectors of the temporally adjacent blocks and the spatially adjacent blocks, so as to save the bit-rate overhead for the direct transmission of the motion vectors, thereby coding efficiency is improved. In the AVS2-3D video encoding standard, with regard to the current encoding block in which Skip/Direct mode encoding is employed, the motion vector(s) of the current encoding block are directly derived from the motion vectors of the temporally adjacent blocks and the spatially adjacent blocks, and the coding efficiency is improved in some degree.

In a multi-view plus depth video, a base view and a dependent view are included at least, each view includes at least two layers, that is, a texture layer and a depth layer. With regard to the current texture layer picture, the depth layer picture corresponding thereto indicates the depth information of the scene in the current picture. With regard to a video including a multi-layer (texture layer and depth layer) information, the current picture and the pictures in different layer corresponding thereto are captured from the same scene, and highly correlated in terms of content. Therefore, the motion vector(s) of the current encoding block and that of the corresponding block in the inter-layer corresponding picture (inter-layer corresponding block) are highly correlated as well. Only the temporally adjacent blocks and the spatially adjacent blocks of the current blocks are referenced to derive the motion vector(s) of the current encoding block in the Skip/Direct mode of the AVS2-3D video encoding standard, the correlation between the layers such as a texture layer and a depth layer is not considered, and the motion vectors in the inter-layer corresponding block are not referenced. Such a method ignores the motion vector information in the inter-layer corresponding block, thus, there is some room for improvement in terms of coding efficiency thereof.

Therefore, it is necessary to provide a method and apparatus for determining a motion vector capable of solving the above technical problem.

DISCLOSURE

Technical Problem

It is necessary to provide a method and apparatus for determining a motion vector in order to improve coding efficiency.

Technical Solution

An object of the present disclosure is to provide a method and apparatus for determining a motion vector in which high video compression efficiency, low overhead of transmission bit-rate and high coding efficiency are achieved through the encoding and decoding using the method and apparatus for determining a motion vector, so as to overcome the deficiency of the prior art.

To achieve the above object, the present disclosure provides a method for determining a motion vector, which comprises the steps of:

determining at least one inter-layer reference block by referring to an inter-layer corresponding block of a current processing block;

determining the motion vector(s) of the current processing block according to the motion vector(s) of the determined at least one inter-layer reference block as well as the motion vector(s) of the other adjacent blocks for the current processing block.

Preferably, the step of determining at least one inter-layer reference block by referring an inter-layer corresponding block of a current processing block comprises: determining several inter-layer reference blocks by referring to the blocks at several positions within the inter-layer corresponding block of the current processing block.

Preferably, the step of determining several inter-layer reference blocks by referring to the blocks at several positions within the inter-layer corresponding block of the current processing block comprises: determining one inter-layer reference block by referring to the block at a predetermined position within the inter-layer corresponding block of the current processing block.

Preferably, the step of determining several inter-layer reference blocks by referring to the blocks at several positions within the inter-layer corresponding block of the current processing block comprises: determining N inter-layer reference blocks by referring to the blocks at N predetermined positions within the inter-layer corresponding block of the current processing block, where N is an integer larger than or equal to 2.

Preferably, the step of determining several inter-layer reference blocks by referring to the blocks at several positions within the inter-layer corresponding block of the current processing block comprises: determining N inter-layer reference blocks by referring to the blocks employing an inter encoding mode at N positions within the inter-layer corresponding block of the current processing block, where N is a positive integer.

Preferably, the step of determining several inter-layer reference blocks by referring to the blocks at several positions within the inter-layer corresponding block of the current processing block comprises: searching for the blocks at several positions within the inter-layer corresponding block of the current processing block in a predetermined order, when the block employing an inter encoding mode at any position is found, terminating the search, and determining one inter-layer reference block by referring to the found block.

Preferably, the step of determining several inter-layer reference blocks by referring to the blocks at several positions within the inter-layer corresponding block of the current processing block comprises:

searching for the blocks at several positions within the inter-layer corresponding block of the current processing block in a predetermined order; if a block at any position having the same prediction mode as that of the current processing block is found, terminating the search, and determining the inter-layer reference block by referring to the found block; if the block having the same prediction mode as that of the current processing block is not found, searching for the blocks at several positions within the inter-layer corresponding block of the current processing block in a predetermined order again, when a block at any position having the motion vector with the same type as the motion vector(s) of the inter-layer reference block to be derived is found, terminating the search, and determining the inter-layer reference block by referring to the found block.

Preferably, the step of determining several inter-layer reference blocks by referring to the blocks at several positions within the inter-layer corresponding block of the current processing block comprises: determining the motion vectors of the several inter-layer reference blocks by referring to the motion vectors of the blocks at several positions within the inter-layer corresponding block of the current processing block.

Preferably, the step of determining the motion vectors of the several inter-layer reference blocks by referring to the motion vectors of the blocks at several positions within the inter-layer corresponding block of the current processing block comprises: if the motion vector M of the block at one position within the inter-layer corresponding block of the current processing block is a motion vector complying with the valid type of the current processing picture, then deriving one motion vector of the corresponding inter-layer reference block according to the motion vector M.

Preferably, if the current processing picture is a unidirectional inter encoding picture, then the motion vectors complying with the valid type of the current processing picture comprise forward motion vectors and first motion vectors;
if the current processing picture is a dual-hypothesis inter encoding picture, then the motion vectors complying with the valid type of the current processing picture comprise forward motion vectors, first motion vectors and second motion vectors;
if the current processing picture is a bi-directional inter encoding picture, then the motion vectors complying with the valid type of the current processing picture comprise forward motion vectors, first motion vectors and backward motion vectors.

Preferably, the step of determining the motion vectors of the several inter-layer reference blocks by referring to the motion vectors of the blocks at several positions within the inter-layer corresponding block of the current processing block comprises:
determining the prediction mode of the inter-layer reference blocks 1 with respect to each motion vector to be determined of an inter-layer reference block determined by referring to a block at one position within the inter-layer corresponding block, if there is a motion vector K in the block having the same type as that of the motion vector to be determined, then determining the motion vector to be determined according to the motion vector K, otherwise, determining the motion vector to be determined according to the motion vector(s) of the block at the one position within the inter-layer corresponding block of which the type is different from the type of the motion vector to be determined.

Preferably, determining that the prediction mode of the current processing block is the prediction mode of the inter-layer reference blocks.

Preferably, the step of determining the motion vectors of the several inter-layer reference blocks by referring to the motion vectors of the blocks at several positions within the inter-layer corresponding block of the current processing block comprises: obtaining the motion vector of one inter-layer reference block by performing scaling operation on the motion vector of the block at one position within the inter-layer corresponding block according to a distance A and a distance B, wherein the distance A refers to the distance between the current processing picture and the inter reference picture of the inter-layer reference block, the distance B refers to the distance between the inter-layer corresponding picture and the inter reference picture of the block at one position within the inter-layer corresponding block, and the block at the one position within the inter-layer corresponding block corresponds to the inter-layer reference block.

Preferably, the orientations of the positions include the upper left corner, upper right corner, lower left corner, lower right corner and central point.

Preferably, the adjacent blocks include a temporally adjacent block and/or a spatially adjacent block.

Preferably, the step of determining the motion vector(s) of the current processing block according to the motion vector(s) of the determined at least one inter-layer reference block as well as the motion vector(s) of the other adjacent blocks of the current processing block comprises: determining the motion vector(s) of the current processing block according to the prediction mode of the current processing block and with reference to the motion vector(s) of the determined at least one inter-layer reference block as well as the motion vector(s) of the other adjacent blocks of the current processing block.

Preferably, the types of the prediction mode include at least one of a forward prediction mode, a backward prediction mode, a uni-forward prediction mode, a bi-directional prediction mode, a symmetrical prediction mode and a dual-forward prediction mode.

To achieve the above object, the present disclosure provides a video encoding method, comprising the above steps and the following step: performing inter prediction and encoding on the current processing block according to the determined motion vector(s) of the current processing block, wherein the step of this performing occurs after determining the motion vector(s) of the current processing block according to the motion vector(s) of the determined at least one inter-layer reference block as well as the motion vector(s) of the other adjacent blocks of the current processing block.

To achieve the above object, the present disclosure provides a video decoding method, comprising the above steps and the following step: performing motion compensation and decoding on the current processing block according to the determined motion vector(s) of the current processing block, wherein the step of this performing occurs after determining the motion vector(s) of the current processing block according to the motion vector(s) of the determined at least one inter-layer reference block as well as the motion vector(s) of the other adjacent blocks of the current processing block.

To achieve the above object, the present disclosure provides an apparatus for determining a motion vector, wherein, comprising: a reference block deriving module configured to determine at least one inter-layer reference block by referring to an inter-layer corresponding block of a current processing block;
a motion vector deriving module configured to determine the motion vector(s) of the current processing block, according to the motion vector(s) of the determined at least one inter-layer reference block as well as the motion vectors of the other adjacent blocks of the current processing block.

To achieve the above object, the present disclosure further provides a video encoder, comprising:

a reference block deriving module configured to determine at least one inter-layer reference block by referring to an inter-layer corresponding block of a current processing block;

a motion vector deriving module configured to determine the motion vector(s) of the current processing block, according to the motion vector(s) of the determined at least one inter-layer reference block as well as the motion vectors of the other adjacent blocks of the current processing block; an inter prediction module configured to perform inter prediction and encoding on the current processing block according to the determined motion vector of the current processing block.

To achieve the above object, the present disclosure further provides a video decoder, comprising:

a reference block deriving module configured to determine at least one inter-layer reference block by referring to an inter-layer corresponding block of a current processing block;

a motion vector deriving module configured to determine the motion vector(s) of the current processing block, according to the motion vector(s) of the determined at least one inter-layer reference block as well as the motion vectors of the other adjacent blocks of the current processing block; a motion compensation module configured to perform motion compensation and decoding on the current processing block according to the determined motion vector of the current processing block.

In comparison with the prior art, the technical effect of the present disclosure comprises: Firstly, when a motion vector of a current processing block is derived, the information of a corresponding block is referred to and inter-layer correlation in a multi-layer video is utilized, thus compression and coding efficiency for a video are improved remarkably.

Secondly, the motion vector is derived by utilizing the information of the inter-layer corresponding block, temporally adjacent block and spatially adjacent block simultaneously, thus, accuracy for derivation of the motion vector is improved extremely.

Advantageous Effects

Based on the motion vector determining method provided herein, coding efficiency for 3D video is improved.

DESCRIPTION OF DRAWINGS

In order to describe the technical solutions in the embodiments of the present disclosure more clearly, the drawings required for describing the embodiments will be introduced briefly hereinafter. Obviously, the drawings described hereinafter only illustrate some of the embodiments of the present disclosure, and one skilled in the art may also obtain other drawings based on these drawings without any creative work.

FIG. 1 is a flow chart illustrating a method for determining a motion vector according to the present disclosure;

FIG. 2 is a flow chart illustrating a video encoding method according to the present disclosure;

FIG. 3 is a flow chart illustrating a video decoding method according to the present disclosure;

FIG. 4 is a modular diagram illustrating an apparatus for determining a motion vector according to the present disclosure; and FIG. 5 is a modular diagram illustrating a video encoder according to the present disclosure; and FIG. 6 is a modular diagram illustrating a video decoder according to the present disclosure.

FIG. 7 is a schematic diagram illustrating a current processing block and an inter-layer corresponding block.

FIG. 8 is a schematic diagram illustrating distances between the current processing picture, the inter-layer corresponding picture and the inter reference picture.

FIG. 9 is a schematic diagram illustrating vectors of the inter-layer reference block and the inter-layer corresponding block.

BEST MODE

A method for determining a motion vector comprising determining at least one inter-layer reference block by referring to an inter-layer corresponding block of a current processing block, determining the motion vector(s) of the current processing block according to the motion vector(s) of the determined at least one inter-layer reference block as well as the motion vectors of the other adjacent blocks of the current processing block is provided.

Mode for Invention

In order for one skilled in the art to understand the technical solutions of the present embodiments better, the technical solutions of the present embodiments will be described clearly and completely in combination with the accompanying drawings in the present embodiment.

Some processes described in the description and claims of the present disclosure, include a plurality of operations that occur in a certain order, but it should be understood that these operations may be performed not in the illustrated order or performed simultaneously. The reference numerals like 101, 102 and the like are only used to distinguish the different operations, and the reference numerals themselves do not indicate any sequence. In addition, these processes may include more or less operations, and these operations may be performed sequentially or simultaneously. It is to be noted that expressions such as "first" "second" or the like in the description are used for distinguish different messages, apparatuses, modules or the like, which neither represent a sequence nor define different types.

Hereinafter, the technical solutions of the present embodiments will be explained clearly and completely in combination with the drawings accompanying the present embodiments. Obviously, the described embodiments are only some rather than all of the embodiments. Other embodiments obtained by one skilled in the art based on the present embodiments without any creative work will fall within the protection scope of the present disclosure.

A method and apparatus illustrated in the present disclosure may be applied to the procedure of multi-layer (including texture layer and depth layer) video encoding and decoding.

Please refer to FIG. 1, a method for determining a motion vector in the present disclosure includes the following steps.

Step 101: at least one inter-layer reference block is determined by referring to an inter-layer corresponding block of a current processing block.

Step 102: the motion vector(s) of the current processing block is determined according to the motion vector(s) of the determined at least one inter-layer reference block as well as the motion vectors of the other adjacent blocks of the current processing block.

Please refer to FIG. 2, the video encoding method in the present disclosure includes the following steps.

Step 201: at least one inter-layer reference block is determined by referring to an inter-layer corresponding block of a current processing block.

Step 202: the motion vector(s) of the current processing block is determined according to the motion vector(s) of the determined at least one inter-layer reference block as well as the motion vectors of the other adjacent blocks of the current processing block.

Step 203: the current processing block is encoded according to the determined motion vector of the current processing block.

Please refer to FIG. 3, the video decoding method in the present disclosure includes the following steps.

Step 301: at least one inter-layer reference block is determined by referring to an inter-layer corresponding block of a current processing block.

Step 302: the motion vector(s) of the current processing block is determined according to the motion vector(s) of the determined at least one inter-layer reference block as well as the motion vectors of the other adjacent blocks of the current processing block.

Step 303: the current processing block is decoded according to the determined motion vector of the current processing block.

In the present disclosure, a block employing a forward prediction mode and a block employing a uni-forward prediction mode have one forward motion vector, respectively. A block employing a backward prediction mode has one backward motion vector. Both a block employing a bi-directional prediction mode and a block employing a symmetrical prediction mode have one forward motion vector and one backward motion vector, respectively. A block employing a dual-forward prediction mode has one first motion vector and one second motion vector, and a block employing an intra-prediction mode does not have a motion vector. The implementation procedure of the method for determining a motion vector, the video encoding method and decoding method according to the present disclosure will be introduced through several embodiments below.

Embodiment 1

In the inter-layer corresponding block of a current processing block in FIG. 7, an encoder or decoder derives one inter-layer reference block T by using a block T' at a predetermined position. The predetermined position includes but not limited to the upper left corner, upper right corner, lower left corner, lower right corner and central point of the inter-layer corresponding block.

The motion vector(s) of the inter-layer reference block T are obtained through the following ways.

As for each motion vector of the block T', if the motion vector(s) of the block T' is the motion vector complying with the valid type of the current processing picture, then the motion vector(s) of the corresponding type of block T is determined according to the motion vector(s) of the block T'. For example, if the current processing picture is a unidirectional inter encoding picture (P picture), then the motion vectors complying with the valid type of the current processing picture include forward motion vectors and first motion vectors. If the current picture is a dual-hypothesis inter encoding picture (F picture), then the motion vectors complying with valid type of the current processing picture include forward motion vectors, first motion vectors and second motion vectors. If the current picture is a bi-directional inter encoding picture (B picture), then the motion vectors complying with the valid type of the current processing picture include forward motion vectors, first motion vectors and backward motion vectors.

Here, the forward motion vectors and the first motion vectors may be considered to belong to a same type of motion vectors.

Specifically, the motion vector(s) of the block T may be obtained by performing scaling operation on the motion vector of the block T' according to a distance A and a distance B, as shown in FIG. 8. The distance A refers to the distance between the current processing picture and the inter reference picture of the block T, the distance B refers to the distance between the inter-layer corresponding picture and the inter reference picture of the block T'. Wherein, the method for deriving the inter reference picture of the block T may be prescribed by a decoder.

After determining the motion vector(s) of the inter-layer reference block T, the encoder or the decoder determines the motion vector(s) of the current processing block through some preset methods, according to the prediction mode of the current processing block and with reference to the motion vector(s) of the inter-layer reference blocks as well as the motion vectors of the other adjacent blocks of the current processing block. Wherein, the other adjacent blocks may be a temporally adjacent block and/or a spatially adjacent block, the types of the prediction mode include at least one of a forward prediction mode, a backward prediction mode, a uni-forward prediction mode, a bi-directional prediction mode, a symmetrical prediction mode and a dual-forward prediction mode.

For a case of encoding, the above-mentioned current processing block namely refers to the current encoding block. After obtaining the motion vector(s) of the current encoding block, the encoder performs inter prediction and encoding on the current encoding block, according to the motion vector(s) of the current encoding block.

For a case of decoding, the above-mentioned current processing block namely refers to the current decoding block. After obtaining the motion vector(s) of the current decoding block, the decoder performs motion compensation and decoding on the current coding block, according to the motion vector(s) of the current decoding block.

Embodiment 2

In the inter-layer corresponding block of a current processing block, an encoder or the decoder derives one inter-layer reference block T by using blocks at several positions. The several positions include but not limited to the upper left corner, upper right corner, lower left corner, lower right corner and central point within the inter-layer corresponding block. The encoder or decoder searches for each of the probable positions which correspond to the blocks at several positions within the inter-layer corresponding block, in a predetermined order. The search is terminated when a block employing an inter encoding mode at a certain position is found, and one inter-layer reference block T is determined according to the block (which is marked as T') at the certain position.

The motion vector(s) of the inter-layer reference block T are obtained through the following ways.

For each motion vector of the block T', if the motion vector(s) of the block T' is the motion vector complying with the valid type of the current processing picture, then the motion vector(s) of the corresponding type of the block T is derived according to the motion vector(s) of the block T'. For example, if the current processing picture is a unidirectional inter encoding picture (P picture), then the motion vectors complying with the valid type of the current processing picture include forward motion vectors and first motion vectors. If the current picture is a dual-hypothesis inter encoding picture (F picture), then the motion vectors complying with valid type of the current processing picture include forward motion vectors, first motion vectors and second motion vectors. If the current picture is a bi-directional inter encoding picture (B picture), then the motion vectors complying with the valid type of the current processing picture include forward motion vectors, first motion vectors and backward motion vectors. Here, the forward motion vectors and the first motion vectors may be considered to belong to a same type of motion vectors.

Specifically, the motion vector(s) of the block T may be obtained by performing scaling operation on the motion vector of the block T' according to a distance A and a distance B. The distance A refers to the distance between the current processing picture and the inter reference picture of the block T, the distance B refers to the distance between the inter-layer corresponding picture and the inter reference picture of the block T'. Wherein, the method for deriving the inter reference picture of the block T may be prescribed by the decoder.

After determining the motion vector(s) of the inter-layer reference block T, the encoder or the decoder determines the motion vector(s) of the current processing block through some preset methods, according to the prediction mode of the current processing block and with reference to the motion vector(s) of the inter-layer reference blocks as well as the motion vectors of the other adjacent blocks of the current processing block. Wherein, the other adjacent blocks may be a temporally adjacent block and/or a spatially adjacent block, the types of the prediction mode include at least one of a forward prediction mode, a backward prediction mode, a uni-forward prediction mode, a bi-directional prediction mode, a symmetrical prediction mode and a dual-forward prediction mode.

For a case of encoding, the above-mentioned current processing block namely refers to the current encoding block. After obtaining the motion vector(s) of the current encoding block, the encoder performs inter prediction and encoding on the current encoding block, according to the motion vector(s) of the current encoding block.

For a case of decoding, the above-mentioned current processing block namely refers to the current decoding block. After obtaining the motion vector(s) of the current decoding block, the decoder performs motion compensation and decoding on the current encoding block, according to the motion vector(s) of the current decoding block.

Embodiment 3

An encoder or decoder derives n inter-layer reference blocks Ti (i=1, 2, 쉘, n) within the inter-layer corresponding block of a current processing block by using blocks T'i (i=1, 2, 쉘, n) at n predetermined positions, where n is an integer larger than or equal to 2. The n predetermined positions include but not limited to the upper left corner, upper right corner, lower left corner, lower right corner and center point within the inter-layer corresponding block.

The motion vectors of the n inter-layer reference blocks Ti (i=1, 2, 쉘, n) are obtained through the following ways.

For each motion vector corresponding to the block T'i, if the motion vector(s) of the block T'i is the motion vector complying with the valid type of the current processing picture, then the motion vector(s) of the corresponding type of the block Ti is derived according to the motion vector(s) of the block T'i. For example, if the current processing picture is a unidirectional inter encoding picture (P picture), then the motion vectors complying with the valid type of the current processing picture include forward motion vectors and first motion vectors. If the current picture is a dual-hypothesis inter encoding picture (F picture), then the motion vectors complying with valid type of the current processing picture include forward motion vectors, first motion vectors and second motion vectors. If the current picture is a bi-directional inter encoding picture (B picture), then the motion vectors complying with the valid type of the current processing picture include forward motion vectors, first motion vectors and backward motion vectors. Here, the forward motion vectors and the first motion vectors may be considered to belong to a same type of motion vectors.

Specifically, the motion vector(s) of the block Ti may be obtained by performing scaling operation on the motion vector of the block T'i according to a distance A and a distance B. The distance A refers to the distance between the current processing picture and the inter reference picture of the block Ti, the distance B refers to the distance between the inter-layer corresponding picture and the inter reference picture of the block T'i. Wherein, the method for deriving the inter reference picture of the block Ti may be prescribed by the decoder.

After determining the motion vectors of the inter-layer reference blocks Ti (i=1, 2, 쉘, n), the encoder or the decoder determines the motion vector(s) of the current processing block through some preset methods, according to the prediction mode of the current processing block and with reference to the motion vector(s) of the inter-layer reference blocks Ti (i=1, 2, 쉘, n) as well as the motion vectors of the other adjacent blocks of the current processing block. Wherein, the other adjacent blocks may be a temporally adjacent block and/or a spatially adjacent block, the types of the prediction mode include at least one of a forward prediction mode, a backward prediction mode, a uni-forward prediction mode, a bi-directional prediction mode, a symmetrical prediction mode and a dual-forward prediction mode.

For a case of encoding, the above-mentioned current processing block namely refers to the current encoding block. After obtaining the motion vector of the current encoding block, the encoder performs inter prediction and encoding on the current encoding block, according to the motion vector(s) of the current encoding block.

For a case of decoding, the above-mentioned current processing block namely refers to the current decoding block. After obtaining the motion vector(s) of the current encoding block, the decoder performs motion compensation and decoding on the current encoding block, according to the motion vector(s) of the current decoding block.

Embodiment 4

An encoder or decoder derives several inter-layer reference blocks Tj (j=1, 2, 쉘, m) within the inter-layer corresponding block of a current processing block by using blocks T'i (i=1, 2, 쉘, n) at n predetermined positions, where M is smaller than n. The n predetermined positions include but not limited to the upper left corner, upper right corner, lower left corner, lower right corner and center point within the inter-layer corresponding block. Specifically, as for any one of the blocks T'i (i=1, 2, 쉘, n) at the n predetermined positions, if the block T'i employs an inter encoding mode, then the encoder or decoder derives one inter-layer reference block Tj by using the block T'i.

The motion vectors of several inter-layer reference blocks Tj (j=1, 2, 젼, m) are obtained through the following ways.

For each motion vector corresponding to the block T'i, if the motion vector(s) of the block T'i is the motion vector complying with the valid type of the current processing picture, then the motion vector(s) of the corresponding type of the block Tj is derived according to the motion vector(s) of the block T'i. For example, if the current processing picture is a unidirectional inter encoding picture (P picture), then the motion vectors complying with the valid type of the current processing picture include forward motion vectors and first motion vectors. If the current picture is a dual-hypothesis inter encoding picture (F picture), then the motion vectors complying with valid type of the current processing picture include a forward motion vector, a first motion vector and a second motion vector. If the current picture is a bi-directional inter encoding picture (B picture), then the motion vectors complying with the valid type of the current processing picture include forward motion vectors, first motion vectors and backward motion vectors. Here, the forward motion vectors and the first motion vectors may be considered to belong to a same type of motion vectors.

Specifically, the motion vector(s) of the block Tj may be obtained by performing scaling operation on the motion vector of the block T'i according to a distance A and a distance B. The distance A refers to the distance between the current processing picture and the inter reference picture of the block Tj, the distance B refers to the distance between the inter-layer corresponding picture and the inter reference picture of the block T'i. Wherein, the method for deriving the inter reference picture of the block Tj may be arbitrarily prescribed by decoder.

After determining the motion vectors of the inter-layer reference blocks Tj (j=1, 2, 젼, m), the encoder or the decoder determines s the motion vector(s) of the current processing block through some preset methods, according to the prediction mode of the current processing block and with reference to the motion vector(s) of the inter-layer reference blocks Tj (j=1, 2, 젼, n) as well as the motion vector(s) of the other adjacent blocks of the current processing block. Wherein, the other adjacent blocks may be a temporally adjacent block and/or a spatially adjacent block, the types of the prediction mode include at least one of a forward prediction mode, a backward prediction mode, a uni-forward prediction mode, a bi-directional prediction mode, a symmetrical prediction mode and a dual-forward prediction mode.

For a case of encoding, the above-mentioned current processing block namely refers to the current encoding block. After obtaining the motion vector(s) of the current encoding block, the encoder performs inter prediction and encoding on the current encoding block, according to the motion vector(s) of the current encoding block.

For a case of decoding, the above-mentioned current processing block namely refers to the current decoding block. After obtaining the motion vector(s) of the current decoding block, the decoder performs motion compensation and decoding on the current encoding block, according to the motion vector(s) of the current decoding block.

Embodiment 5

In the inter-layer corresponding block of a current processing block, an encoder or decoder determines one inter-layer reference block T by using a block T' at a certain predetermined position. The position include but not limited to the upper left corner, upper right corner, lower left corner, lower right corner and central point within the inter-layer corresponding block. If there are/is motion vectors/vector in the block T', then the prediction mode of the inter-layer reference block T is set as the prediction mode of the current processing block.

In FIG. 9, the motion vector(s) of the inter-layer reference block T are obtained through the following ways.

For each motion vector C of the block T to be derived, if there is a motion vector D in the block T' having the same type as that of the motion vector C, then the motion vector C is derived according to the motion vector D. Otherwise, if there is no motion vector D in the block T' having the same type as that of the motion vector C, then the motion vector C is derived according to the motion vector(s) of the block T' of which the type is different from that of the motion vector C. Here, it may be considered that the forward motion vectors and the first motion vectors belong to a same type of motion vectors.

Specifically, the motion vector(s) of the block T may be obtained by performing scaling operation on the motion vector of the block T' according to a distance A and a distance B. The distance A refers to the distance between the current processing picture and the inter reference picture of the block T, the distance B refers to the distance between the inter-layer corresponding picture and the inter reference picture of the block T'. Wherein, the method for deriving the inter reference picture of the block T may be arbitrarily prescribed by the decoder.

After determining the motion vector(s) of the inter-layer reference block T, the encoder or the decoder determines the motion vector(s) of the current processing block through some preset methods, according to the prediction mode of the current processing block and with reference to the motion vectors of the inter-layer reference blocks as well as the motion vectors of the other adjacent blocks of the current processing block. Wherein, the other adjacent blocks may be a temporally adjacent block and/or a spatially adjacent block, the types of the prediction mode include at least one of a forward prediction mode, a backward prediction mode, a uni-forward prediction mode, a bi-directional prediction mode, a symmetrical prediction mode and a dual-forward prediction mode.

For a case of encoding, the above-mentioned current processing block namely refers to the current encoding block. After obtaining the motion vector(s) of the current encoding block, the encoder performs inter prediction and encoding on the current encoding block, according to the motion vector(s) of the current encoding block.

For a case of decoding, the above-mentioned current processing block namely refers to the current decoding block. After obtaining the motion vector of the current decoding block, the decoder performs motion compensation and decoding on the current encoding block, according to the motion vector(s) of the current decoding block.

Embodiment 6

In the inter-layer corresponding block of a current processing block, an encoder or decoder determines one inter-layer reference block T by using blocks at several positions. The several positions include but not limited to the upper left corner, upper right corner, lower left corner, lower right corner and central point within the inter-layer corresponding block. The encoder or decoder searches for each of the probable positions which are the blocks at several positions within the inter-layer corresponding block, in a predetermined order. The search is terminated when a block employing the inter mode at a certain position is found, and one inter-layer reference block T is determined according to the block T'. If there are/is a motion vectors/vector in the block T', then the prediction mode of the block T is set as the prediction mode of the current processing block.

In FIG. 9, the motion vector(s) of the inter-layer reference block T are obtained through the following ways.

For each motion vector C of the block T to be derived, if there is a motion vector D in the block T' having the same type as that of the motion vector C, then the motion vector C is derived according to the motion vector D. Otherwise, if there is no motion vector D in the block T' having the same type as that of the motion vector C, then the motion vector C is derived according to the motion vector(s) of the block T' of which the type is different from that of the motion vector C. Here, it may be considered that the forward motion vectors and the first motion vectors belong to a same type of motion vectors.

Specifically, the motion vector(s) of the block T may be obtained by performing scaling operation on the motion vector(s) of the block T' according to a distance A and a distance B. The distance A refers to the distance between the current processing picture and the inter reference picture of the block T, the distance B refers to the distance between the inter-layer corresponding picture and the inter reference picture of the block T'. Wherein, the method for deriving the inter reference picture of the block T may be arbitrarily prescribed by the decoder.

After determining the motion vector(s) of the inter-layer reference block T, the encoder or the decoder determines the motion vector(s) of the current processing block through some preset methods, according to the prediction mode of the current processing block and with reference to the motion vectors of the inter-layer reference blocks as well as the motion vectors of the other adjacent blocks of the current processing block. Wherein, the other adjacent blocks may be a temporally adjacent block and/or a spatially adjacent block, the types of the prediction mode include at least one of a forward prediction mode, a backward prediction mode, a uni-forward prediction mode, a bi-directional prediction mode, a symmetrical prediction mode and a dual-forward prediction mode.

For a case of encoding, the above-mentioned current processing block namely refers to the current encoding block. After obtaining the motion vector(s) of the current encoding block, the encoder performs inter prediction and encoding on the current encoding block, according to the motion vector(s) of the current encoding block.

For a case of decoding, the above-mentioned current processing block namely refers to the current decoding block. After obtaining the motion vector(s) of the current encoding block, the decoder performs motion compensation and decoding on the current encoding block, according to the motion vector(s) of the current decoding block.

Embodiment 7

In the inter-layer corresponding block of a current processing block, an encoder or decoder derives one inter-layer reference block T by using blocks at several positions. The several positions include but not limited to the upper left corner, upper right corner, lower left corner, lower right corner and central point within the inter-layer corresponding block. The prediction mode of the block T is set as the prediction mode of the current processing block.

In FIG. 9, the motion vector(s) of the inter-layer reference block T are obtained through the following ways.

The encoder or decoder searches for each of the probable positions which are the blocks at several positions within the inter-layer corresponding block, in a predetermined order. If a block at any position having the same prediction mode as that of the current processing block is found, the search is terminated, and the motion vector(s) of the inter-layer reference block T is determined according to the motion vector(s) of the block T'. After searching for each of the probable positions which are the blocks at several positions within the inter-layer corresponding block, in a predetermined order, if the encoder or decoder fails to find a block having the same prediction mode as that of the current processing block, then the encoder or decoder searches for each of the probable positions which are the blocks at several positions within the inter-layer corresponding block, in a predetermined order again with respect to each of the motion vectors C of block T to be derived. When a block marked as T' at a certain position having a motion vector D with the same type as that of the motion vector is found, the search is terminated, and the motion vector C is determined according to the motion vector D.

Specifically, the motion vector(s) of the block T may be obtained by performing scaling operation on the motion vector of the block T'/T" according to a distance A and a distance B. The distance A refers to the distance between the current processing picture and the inter reference picture of the block T, the distance B refers to the distance between the inter-layer corresponding picture and the inter reference picture of the block T'/T". Wherein, the method for deriving the inter reference picture of the block T may be arbitrarily prescribed by the decoder.

After determining the motion vector(s) of the inter-layer reference block T, the encoder or the decoder determines the motion vector(s) of the current processing block through some preset methods, according to the prediction mode of the current processing block and with reference to the motion vectors of the inter-layer reference blocks as well as the motion vectors of the other adjacent blocks of the current processing block. Wherein, the other adjacent block may be a temporally adjacent block and/or a spatially adjacent block, the types of the aforementioned prediction mode include at least one of a forward prediction mode, a backward prediction mode, a uni-forward prediction mode, a bi-directional prediction mode, a symmetrical prediction mode and a dual-forward prediction mode.

For a case of encoding, the above-mentioned current processing block namely refers to the current encoding block. After obtaining the motion vector(s) of the current encoding block, the encoder performs inter prediction and encoding on the current encoding block, according to the motion vector(s) of the current encoding block.

For a case of decoding, the above-mentioned current processing block namely refers to the current decoding block. After obtaining the motion vector(s) of the current encoding block, the decoder performs motion compensation and decoding on the current encoding block, according to the motion vector(s) of the current decoding block.

Please refer to FIG. 4, an apparatus for determining a motion vector in the present disclosure includes:
  a reference block deriving module 11 configured to determine at least one inter-layer reference block by referring to inter-layer corresponding block of a current processing block;
  a motion vector deriving module 12 configured to determine the motion vector(s) of the current processing block, according to the motion vector(s) of the determined at least one inter-layer reference block as well as the motion vectors of the other adjacent blocks of the current processing block.

The operating procedures of the reference block deriving module11 and the motion vector deriving module 12 correspond to the steps 101 and 102 of the method for determining a motion vector of the present disclosure, and will not be repeated in detail herein.

Please refer to FIG. 5, the video encoder in the present disclosure includes:
a reference block deriving module 21 configured to determine at least one inter-layer reference block by referring to an inter-layer corresponding block of a current processing block;
a motion vector deriving module 22 configured to determine the motion vector(s) of the current processing block, according to the motion vector(s) of the determined at least one inter-layer reference block as well as the motion vectors of the other adjacent blocks of the current processing block; an inter prediction module 23 configured to encode the current processing block according to the determined motion vector of the current processing block.

The operating procedures of the reference block deriving module 21, motion vector deriving module 22 and the inter prediction module 23 correspond to the steps 201, 202 and 203 of the video encoding method of the present disclosure, and will not be repeated in detail herein.

Please refer to FIG. 6, the video decoder in the present disclosure includes:
a reference block deriving module 31 configured to determine at least one inter-layer reference block by referring to an inter-layer corresponding block of a current processing block;
a motion vector deriving module 32 configured to determine the motion vector(s) of the current processing block, according to the motion vector(s) of the determined at least one inter-layer reference block as well as the motion vectors of the other adjacent blocks of the current processing block; a motion compensation module 33 configured to decode the current processing block according to the determined motion vector of the current processing block.

The operating procedures of the reference block deriving moduleS1, motion vector deriving module 32 and the motion compensation module 33 correspond to the steps 301, 302 and 303 of the video decoding method of the present disclosure, and will not be repeated in detail herein.

It may be seen from the above detailed description in the present disclosure that the present disclosure at least has the following technical effect in comparison with the prior art: Firstly, a motion vector of a current processing block is derived by referring to the motion vector information of the inter-layer corresponding block, and the prediction mode of the inter-layer reference block is able to be configured flexibly as needed. Since there is strong correlation between the inter-layer block and the current processing block in terms of inter motion, more accurate inter prediction may be achieved, more redundant information between pictures may be removed, and compression, encoding and decoding efficiency for a video are improved remarkably.

Secondly, the motion vector is derived by utilizing the information of the inter-layer corresponding block, temporally adjacent block and spatially adjacent block simultaneously, thus, accuracy for derivation of the motion vector is improved extremely.

It should be understood in the several embodiments provided in the present application that the disclosed system, device and method may be implemented in other ways. For example, the aforementioned devices of the embodiments are only illustrative. For example, the division of the units is only a division based on logical function, and when they are implemented practically, there may be another division. For example, a plurality of units or components may be combined or integrated into another system, or some features may be omitted or not performed. In addition, the illustrated or discussed coupling or direct coupling or communication connection may be indirect coupling or communication connection via some interface, device or unit, and may be electrically, mechanically or in other forms.

The units that are illustrated as separated components may be separated physically or not. A component being illustrated as a unit may be a physical unit or not, may be located at one place, or may be distributed to a plurality of network units. The objects of the present embodiments may be achieved by selecting some or all of the units according to the practical needs.

In addition, the respective functional units in each of the present embodiments may be integrated into one processing unit, or may be individual units that exist physically. Alternatively, two or more units may be integrated into one unit. The above integrated unit may be implemented with either hardware or software functional unit.

It shall be understood by one of ordinary skills in the art that some or all of steps in the respective methods of the above embodiments may be performed by instructing a corresponding hardware through program. The program may be stored in a computer readable storage medium, and the storage medium may include a read only memory (ROM), a random access memory (RAM), a disc, an optical disc or the like.

The method and device provided in the present disclosure have been described in detail hereinbefore, and one of ordinary skills in the art may change the specific embodiments and the application scope thereof according to the spirit of the present embodiments. Therefore, the disclosure of the description should not be considered as a limit to the present embodiments.

The invention claimed is:

1. A method for determining a motion vector, comprising:
determining an inter-layer reference block by referring to a central position within an inter-layer corresponding block of a current processing block and determining a motion vector if the inter-layer reference block by referring to a motion vector of a block at the central position within the inter-layer corresponding block; and
determining at least one motion vector of the current processing block according to the motion vector of the determined inter-layer reference block as well as motion vectors of other adjacent blocks of the current processing block,
wherein the determining of the at least one motion vector of the current processing block comprises:
obtaining a prediction type of the inter-layer reference block according to a picture type of the current processing block, wherein the prediction type is one of a forward prediction mode, a backward prediction mode, a uni-forward prediction mode, a bi-directional predication mode, a symmetrical prediction mode and a dual-forward prediction mode;
when a prediction type of the motion vector of the block at the central position within the inter-layer corresponding block is the same as a prediction type of the motion vector of the inter-layer layer reference block, determining the at least one motion vector of the current processing block according to the motion vector of the inter-layer reference block; and when the prediction type of the motion vector of the block at the central position within the inter-layer corresponding block is not the same as the prediction type of the motion vector of the inter-layer reference block, determining the at least one motion vector of the current processing block according to the motion vector of the block at the central position within the inter-layer corresponding block of which the prediction type is different from the prediction type of the emotion vector if the inter-layer reference block.

2. The method according to claim 1, wherein the determining of the motion vector of the inter-layer reference block by referring to the motion vector of the block at the central position within the inter-layer corresponding block comprises: if a motion vector M of the block at the central position within the inter-layer corresponding block of the current processing block is a motion vector complying with a valid picture type of the current processing picture, deriving one motion vector of a corresponding inter-layer reference block according to the motion vector M, wherein the valid picture type is one of a unidirectional inter encoding picture type (P picture type), a dual-hypothesis inter encoding picture type (F picture type), or a bi-directional inter encoding picture type (B picture type).

3. The method according to claim 1, wherein the determining of the motion vector of the inter-layer reference block by referring to the motion vector of the block at the central position within the inter-layer corresponding block comprises: obtaining the motion vector of the inter-layer reference block by performing scaling operation on the motion vector of the block at the central position within the inter-layer corresponding block according to a first distance and a second distance, wherein the first distance refers to a distance between the current processing picture and an inter reference picture of the inter-layer reference block, the second distance refers to the distance between the inter-layer corresponding picture and an inter reference picture of the block at the central position within the inter-layer corresponding block, and the block at the central position within the inter-layer corresponding block corresponds to the inter-layer reference block.

4. The method according to claim 1, wherein the determining of the at least one motion vector of the current processing block according to the motion vector of the determined inter-layer reference block as well as the motion vectors of the other adjacent blocks of the current processing block comprises: determining the at least one motion vector of the current processing block according to a prediction mode of the current processing block and with reference to the motion vector of the determined inter-layer reference block as well as the motion vectors of the other adjacent blocks of the current processing block.

5. The method according to claim 1, wherein, after the determining of the at least one motion vector of the current processing block according to the motion vector of the determined inter-layer reference block as well as the motion vectors of the other adjacent blocks of the current processing block, the method further comprises:

encoding the current processing block according to a determined motion vector of the current giving out block.

6. The method according to claim 1, wherein, after the determining of the at least one motion vector of the current processing block according to the motion vector of the determined inter-layer reference block as well as the motion vectors of the other adjacent blocks of the current processing block, the method further comprises:

decoding the current processing block according to the determined at least one motion vector of the current processing block.

7. An apparatus for determining a motion vector, implemented with a hardware processor, comprising:

a reference block deriving module configured to determine inter-layer reference block by referring to a central position within an inter-layer corresponding block of a current processing block and determine a motion vector of the inter-layer reference block by referring to a motion vector of a block at the central position within the inter-layer corresponding block;

a motion vector deriving module configured to determine at least one motion vector of the current processing block, according to the motion vector of the determined inter-layer reference block as well as motion vectors of other adjacent blocks of the current processing blocks, wherein the motion vector deriving module is configured to:

obtain a prediction type of the inter-layer reference block according to a picture type of the current processing block, the prediction type being one of a forward prediction mode a backward prediction mode, a uni-forward prediction mode, a bi-directional prediction mode, a symmetrical prediction mode and a dual-forward prediction mode, when a prediction type of the motion vector of the block at the central position within the inter-layer corresponding block is the same as a prediction type of the motion vector of the inter-layer reference block, determine the at least one motion vector of the current processing block according to the motion vector of the inter-layer reference block, and when the prediction type of the motion vector of the block at the central position within the inter-layer corresponding block is not the same as the prediction type of the motion vector of the inter-layer reference block, determine the at least one motion vector of the current, processing block according to the motion vector of the block at the central position within the inter-layer corresponding block of which the prediction type is different from the prediction type of the motion vector of the inter-layer reference block.

\* \* \* \* \*